United States Patent
Yamada et al.

(10) Patent No.: US 8,128,745 B2
(45) Date of Patent: Mar. 6, 2012

(54) EMULSION INK AND METHOD FOR PRODUCING SAME

(75) Inventors: Kenji Yamada, Ibaraki-ken (JP); Yoshiaki Matsuzawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 397 days.

(21) Appl. No.: 12/585,595

(22) Filed: Sep. 18, 2009

(65) Prior Publication Data
US 2010/0086693 A1 Apr. 8, 2010

(30) Foreign Application Priority Data

Oct. 6, 2008 (JP) ............... P2008-259862
Aug. 10, 2009 (JP) ............... P2009-185795

(51) Int. Cl.
*C09D 11/00* (2006.01)
(52) U.S. Cl. ................... 106/31.26; 106/31.6
(58) Field of Classification Search ........... 106/31.26, 106/31.6
See application file for complete search history.

(56) References Cited

U.S. PATENT DOCUMENTS

| | | | | |
|---|---|---|---|---|
| 5,575,839 A * | 11/1996 | Okuda | ............ | 106/31.25 |
| 5,776,232 A * | 7/1998 | Okuda et al. | ............ | 106/31.26 |
| 5,904,759 A * | 5/1999 | Okuda et al. | ............ | 106/31.26 |
| 6,527,842 B1 * | 3/2003 | Adams et al. | ............ | 106/31.26 |
| 6,632,273 B2 * | 10/2003 | Hayashi et al. | ............ | 106/31.26 |
| 2010/0021838 A1 * | 1/2010 | Putnam et al. | ............ | 430/107.1 |

FOREIGN PATENT DOCUMENTS

| | | |
|---|---|---|
| JP | 10-168370 A | 6/1998 |
| JP | 11-1649 A | 1/1999 |
| JP | 2009-056931 A | 3/2006 |

* cited by examiner

*Primary Examiner* — Helene Klemanski
(74) *Attorney, Agent, or Firm* — The Nath Law Group; Jerald L. Meyer; Joshua B. Goldberg

(57) ABSTRACT

An emulsion ink capable of generating a printed image quality having favorable print density and a favorable matte finish. A water-in-oil emulsion ink having an oil phase and a water phase, wherein the ink has a first water phase comprising a colorant and a second water phase comprising no colorant, and the amount (mass) of the first water phase is less than the amount (mass) of the second water phase.

9 Claims, 1 Drawing Sheet

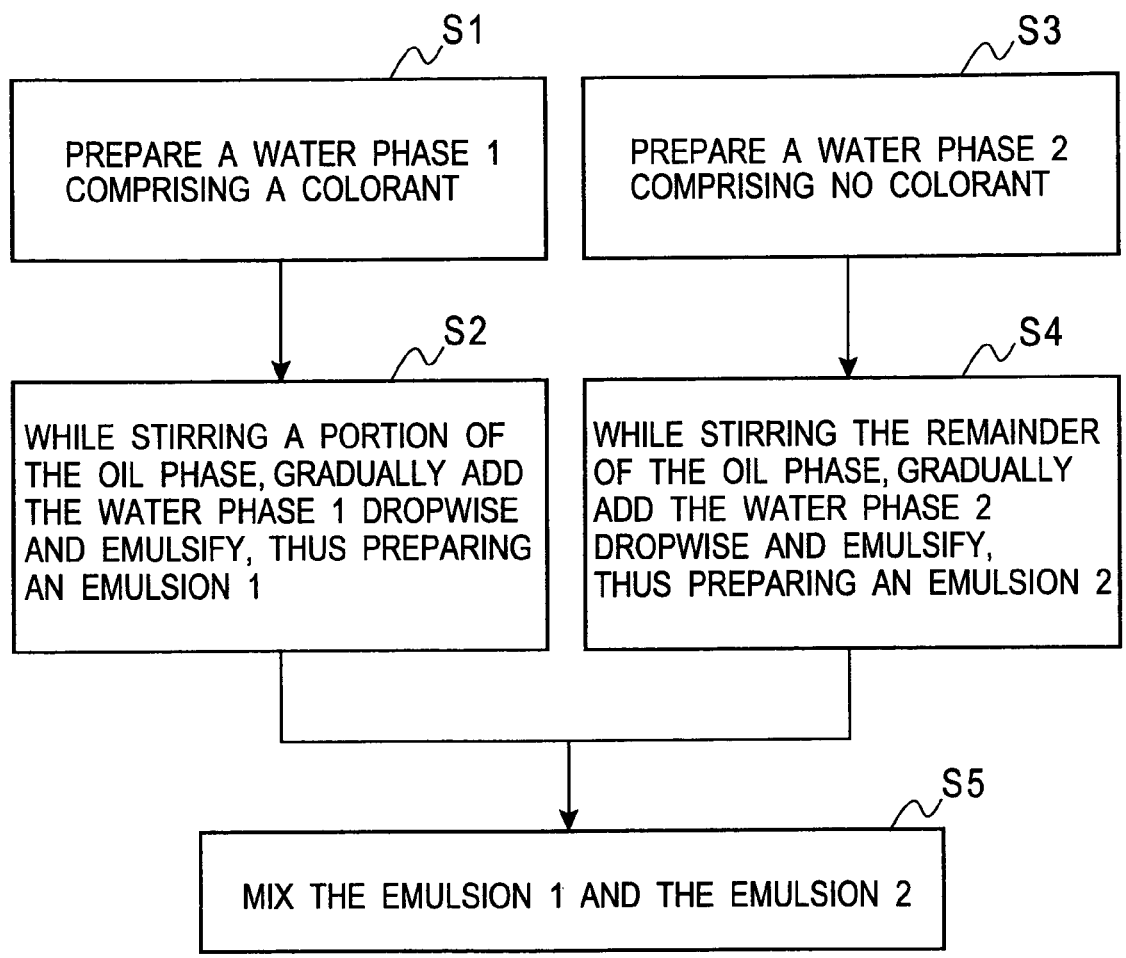

EMULSION INK AND METHOD FOR PRODUCING SAME

CROSS REFERENCE TO RELATED APPLICATIONS

This application is based upon and claims the benefit of priority from prior Japanese Patent Application No. 2008-259862 field on Oct. 6, 2008 and Japanese Patent Application No. 2009-185795 field on Aug. 10, 2009, the entire contents of which are incorporated by reference herein.

TECHNICAL FIELD

The present invention relates to an emulsion ink, a printing method that uses the ink, and a method for producing the ink.

BACKGROUND ART

Emulsion inks are well known as the inks used in stencil printing systems and inkjet printing systems or the like.

A stencil printing system is a system in which a stencil printing base paper is used to form a printing plate, and printing is then conducted onto a printing target such as a sheet of paper by causing an ink to pass through the perforations formed in the base paper during plate preparation. Because of its favorable operability and relative simplicity, stencil printing is used in a wide range of fields.

An inkjet printing system is a printing system in which printing is conducted by spraying a liquid ink with a high degree of fluidity from very fine nozzles, and adhering that ink to a recording medium such as a sheet of paper. This type of system enables the printing of high-resolution, high-quality images at high speed and with minimal noise, using a comparatively inexpensive printing apparatus, and is rapidly becoming widespread.

Water-in-oil (W/O) emulsion inks are generally used as the emulsion inks. When a water-in-oil emulsion ink is printed onto a printing target such as a sheet of paper, first, the oil phase component(s) that constitute the outer phase of the emulsion penetrate into the paper or the like, and subsequently, the water phase component(s) that constitute the inner phase penetrate into the interior of the paper or the like and/or are scattered on the paper or the like. In the case of a water-in-oil emulsion ink that includes a coloring component within the oil phase, the coloring component penetrates into the paper or the like together with the oil phase, and as a result, the coloring component penetrates into the interior of the paper or the like, increasing the likelihood of show-through. Further, this penetration phenomenon also occurs at the surface of the paper, which can sometimes cause the ink to spread across the paper surface, causing bleeding.

In order to address these types of problems, Patent Document 1 proposes a water-in-oil emulsion ink in which the colorant is incorporated within the water phase. With this type of emulsion ink, because the oil phase first penetrates into the paper or the like, and the water phase then penetrates thereafter, the coloring component within the water phase can be prevented by the oil phase from penetrating too deeply into the paper or the like. As a result, an image quality can be obtained that exhibits a high print density, and minimal ink bleeding and show-through.

Patent Document 2 provides a water-in-oil emulsion ink in which by blending a water phase containing a pigment into the oil phase, stirring the resulting system, and then continuously adding a water phase containing a water-soluble polymer to the system under constant stirring, the water phase can be dispersed uniformly while the production line is simplified, yielding a water-in-oil emulsion ink having a print density similar to conventional inks.

Patent Document 3 proposes a method of addressing the problems of print dot size and image density that are common to both aqueous inks and oil-based inks, by using a water-in-oil emulsion ink.

[Patent Document 1] Japanese Patent Laid-Open No. H11-1649

[Patent Document 2] Japanese Patent Laid-Open No. H10-168370

[Patent Document 3] Japanese Patent Laid-Open No. 2006-56931

Generally, in order to ensure that the gloss of the printed image is similar to that of the printing target such as a sheet of paper, which enables better discernment of the text or the like of the printed item, a matte printed image of low gloss is preferred. However, if a conventional emulsion ink is used, then the printed image tends to cause specular reflection of external light, meaning the images of text or the like can sometimes be difficult to distinguish.

In Patent Document 2, water phases containing different components are added separately and continuously to the oil phase and subsequently emulsified, and because, in this manner, the water phases dispersed within the oil phase are combined and the components contained therein are dispersed equally during the emulsification process, the water phase within the final ink has an overall uniform composition. In other words, although the production method differs, the ink actually has the same configuration as conventional emulsion inks, and suffers from the same problems outlined above.

SUMMARY OF THE INVENTION

An object of the present invention is to provide an emulsion ink capable of generating a printed image quality having favorable print density and a favorable matte finish, as well as a method for producing such an ink.

A first aspect of the present invention is a water-in-oil emulsion ink having an oil phase and a water phase, wherein the ink has a first water phase comprising a colorant and a second water phase comprising no colorant, and the amount (mass) of the first water phase is less than the amount (mass) of the second water phase.

Another aspect of the present invention is a printing method that uses the above emulsion ink.

Yet another aspect of the present invention is a method for producing a water-in-oil emulsion ink having an oil phase and a water phase, the method comprising: preparing a first water phase comprising a colorant, preparing a first emulsion comprising the first water phase and a portion of the oil phase, preparing a second water phase comprising no colorant, preparing a second emulsion comprising the second water phase and another portion of the oil phase, and mixing the first emulsion and the second emulsion, wherein the amount (mass) of the first water phase is less than the amount (mass) of the second water phase.

BRIEF DESCRIPTION OF THE DRAWINGS

FIG. 1 is a flowchart of one embodiment of the method for producing an emulsion ink according to the present invention.

DETAILED DESCRIPTION OF THE EMBODIMENTS

Embodiments according to the present invention are described below, but the examples in the following embodiments in no way limit the present invention.

The present invention is able to provide an emulsion ink capable of generating a printed image quality having favorable print density and a favorable matte finish, as well as a method for producing such an ink.

An emulsion ink of the present invention is a water-in-oil emulsion ink having an oil phase and a water phase, wherein the ink has a first water phase comprising a colorant and a second water phase comprising no colorant, and the amount (mass) of the first water phase is less than the amount (mass) of the second water phase.

According to the emulsion ink of the present invention, a printed image quality having favorable print density and a favorable matte finish can be obtained. In other words, because the first water phase comprising the colorant and the second water phase comprising no colorant coexist within the ink, a printed image quality having a high print density and a low-gloss matte finish can be obtained, and the distinguishability of text and the like is particularly favorable.

The emulsion ink of the present invention is a water-in-oil emulsion ink having an oil phase and a water phase, wherein the ratio between the oil phase and the water phase is within a range from oil phase (10 to 70 mass %):water phase (30 to 90 mass %).

The water phase of the emulsion ink of the present invention includes a first water phase comprising a colorant and a second water phase comprising no colorant.

The amount of the colorant within the first water phase comprising the colorant preferably represents the total amount of colorant contained within the combined water phases. The water phase comprising the colorant may be either a single phase, or two or more different phases. In the case of two or more different phases, a plurality of water phases containing different types of colorants or different colorant amounts can be included within the ink.

Further, the amount of the colorant within the second water phase comprising no colorant is effectively 0 mass %. Depending on the production process, the storage state and the usage environment, a small amount of the colorant within the ink may become incorporated within the second water phase comprising no colorant, but this amount is within the margin of error, and this type of state is deemed to fall within the scope of the second water phase comprising no colorant according to the present invention. Within this margin of error, 3 mass % or less of the colorant contained within the first water phase may be incorporated within the second water phase comprising no colorant.

The amount of colorant used in the present invention, relative to the total mass of the ink, is preferably not less than 1 mass %, is more preferably not less than 3 mass %, and is still more preferably 5 mass % or greater. Moreover, the amount of colorant is preferably not more than 20 mass %, is more preferably not more than 15 mass %, and is still more preferably 10 mass % or less. In the present invention, the colorant is preferably incorporated within the first water phase in an amount within the above range, with essentially no colorant being included within the second water phase.

Ensuring a colorant amount of not less than 1 mass % enables a print density to be obtained that is ideal for achieving favorable coloration and color development, whereas using an amount of not more than 20 mass % enables mutual aggregation of colorant particles and aggregation of the colorant with other components to be suppressed, meaning ink degradation can be prevented.

The amount (mass) of the first water phase is less than the amount (mass) of the second water phase.

By including the first water phase and the second water phase within the ink in amounts that satisfy the above ranges, a print density can be obtained that is ideal for achieving favorable coloration and color development, a state can be achieved in which the first water phase comprising the colorant and the second water phase comprising no colorant can coexist within the ink, and a printed image quality having a low-gloss matte finish can be obtained. In particular, ensuring that the amount of the first water phase is less than the amount of the second water phase enables a printed image quality to be obtained, upon printing, that exhibits a low-gloss matte finish.

The mass ratio between the first water phase and the second water phase is preferably within a range from 1:1.1 to 1:4.0, and is more preferably from 1:1.2 to 1:2.2. In particular, ensuring that the mass ratio between the first water phase and the second water phase is not more than 1:4.0 enables the proportion of the first water phase comprising the colorant to be maintained at an appropriate level, thereby preventing any deterioration in the print density.

Examples of the colorant in the present invention include pigments and dispersion dyes and the like of all manner of hues. Colorants that exhibit favorable affinity with the water that acts as the main solvent are preferred. Specific examples include carbon blacks such as acetylene black, channel black and furnace black, metal powders such as aluminum powder and bronze powder, inorganic pigments such as red iron oxide, chrome yellow, ultramarine blue and chromium oxide, organic pigments such as azo-based pigments, phthalocyanine-based pigments, condensed polycyclic pigments and the various dye lakes (including aniline black, Hansa yellow, disazo carmine 6B, phthalocyanine blue and alkali blue), dispersion dyes such as azo-based dyes and anthraquinone-based dyes, and combinations of two or more of the above colorants.

The colorant of the present invention is preferably an ionic pigment or a pigment that has been dispersed using an ionic dispersant. Because the ink of the present invention has the first water phase comprising the colorant and the second water phase comprising no colorant, by incorporating an ionic pigment within the first water phase, and incorporating any components that may aggregate readily with the ionic pigment in the second water phase, aggregation between the components can be prevented. By treating a pigment that has been dispersed using an ionic dispersant in a similar manner, aggregation between the ink components can be prevented.

An ionic pigment can be obtained, for example, by using a chemical or physical treatment to introduce ionic functional groups at the pigment surface. Examples of these ionic functional groups include anionic functional groups such as a sulfonic acid group, carboxyl group, carbonyl group, hydroxyl group or phosphonic acid group, and cationic functional groups such as a quaternary ammonium group or quaternary phosphonium group.

A pigment that has been dispersed using an ionic dispersant can be obtained by incorporating, within the water phase, a pigment and an ionic dispersant that is used for dispersing the pigment. Examples of the ionic dispersant include the ionic surfactants amongst the surfactants listed below as potential dispersants for inclusion within the water phase.

The average particle size of the colorant of the present invention is preferably not more than 10 μm, and is more preferably 3 μm or less. Ensuring that the average particle size is not more than 10 μm prevents disintegration of the water-in-oil emulsion ink, and enables the print density and the gloss to be maintained at favorable levels.

Although there are no particular restrictions on the water included in the water phase of the present invention, a water that contains minimal impurities, such as a purified water such as ion-exchanged water or distilled water, or an ultrapure water is preferred.

Further, if required, surfactants that act as dispersants, wetting agents, electrolytes, antifreeze agents, water-soluble polymers, and oil-in-water resin emulsions and the like may also be added to the water phase of the present invention.

Examples of the surfactants that act as dispersants include anionic surfactants, cationic surfactants, amphoteric surfactants and nonionic surfactants, as well as polymer-based, silicone-based or fluorine-based surfactants, and combinations of two or more of these surfactants. These surfactants are able to improve the wettability and dispersibility of the colorant within the water. Specific examples of the surfactant include ionic surfactants such as the sodium salt of a β-naphthalenesulfonic acid-formalin condensate, the sodium salt of a polystyrenesulfonic acid and the sodium salt of a melaminesulfonic acid-formalin condensate, as well as polyvinylpyrrolidone and bisphenol sulfonic acid polymers.

Examples of the wetting agents include polyhydric alcohols such as ethylene glycol, propylene glycol, diethylene glycol, sorbitol and glycerol, polyethers such as polyethylene glycol and polypropylene glycol, and combinations of two or more of these wetting agents.

Examples of the electrolytes include sodium sulfate, magnesium sulfate, potassium hydrogen phosphate, sodium citrate, potassium tartrate and sodium borate, as well as combinations of two or more of these electrolytes.

Examples of the antifreeze agents (volatilization inhibiting components) include polyhydric alcohols such as ethylene glycol, glycerol and propylene glycol, polyhydric alcohol alkyl ethers such as ethylene glycol monoethyl ether, and combinations of two or more of these antifreeze agents.

Examples of the water-soluble polymers include polyvinyl alcohol, polyvinylpyrrolidone, polyethylene-polyvinyl alcohol copolymers, polyethylene oxide, polyvinyl ether, polyacrylamide, sodium polyacrylate, gum arabic, starch, water-soluble polyurethane, and cellulose derivatives such as methylcellulose, carboxymethylcellulose and hydroxyethylcellulose. Combinations of two or more of these water-soluble polymers may also be used.

Examples of the oil-in-water resin emulsions include resin emulsions of polyvinyl acetate, ethylene-vinyl acetate copolymers, vinyl acetate-acrylate ester copolymers, polymethacrylate esters, polystyrene, styrene-acrylate ester copolymers, styrene-butadiene copolymers, vinylidene chloride-acrylate ester copolymers, vinyl chloride resins, vinyl chloride-vinyl acetate copolymers and urethane resins, and wax emulsions such as amide wax, PTFE wax, modified polypropylene wax, mixed wax, polyethylene wax and lanolin wax, as well as combinations of two or more of these oil-in-water emulsions.

The water-soluble polymers and oil-in-water resin emulsions described above are able to improve the wetting properties and dispersibility of pigments and extender pigments, and also improve the fixing properties of the colorant on the printing target such as paper.

The oil phase component of the emulsion ink of the present invention may include solvents, surfactants that act as emulsifiers, and resin components and the like.

Oil components can be used as the solvents. Examples of the oil components include vegetable oils such as soybean oil, corn oil, sunflower oil, rapeseed oil, safflower oil, grapeseed oil, sesame oil, castor oil, camellia oil, olive oil, coconut oil and palm oil, mineral oils such as liquid paraffin, spindle oil, light oil, kerosene, machine oil, lubricant oil and synthetic oil, petroleum-based solvents such as olefin-based hydrocarbons and aromatic hydrocarbons, and combinations of two or more of these oil components.

Further, both non-polar solvents and polar solvents may be used as the above solvents. These solvents may be used individually, or in combinations of two or more different solvents, provided they form a single phase.

Petroleum-based hydrocarbon solvents such as naphthene-based solvents, paraffin-based solvents and isoparaffin-based solvents may be used as the non-polar solvents, and specific examples thereof include aliphatic saturated hydrocarbons such as dodecane, ISOPAR and EXXSOL (both brand names) manufactured by Exxon Mobil Corporation, AF solvent (a brand name) manufactured by Nippon Oil Corporation, and SUNTHENE and SUNPAR (both brand names) manufactured by Sun Oil Company, Ltd. These solvents may be used individually, or in combinations of two or more solvents.

Examples of the polar solvents include ester-based solvents, alcohol-based solvents, higher fatty acid-based solvents and ether-based solvents. These solvents may be used individually, or in combinations of two or more solvents.

Examples of the ester-based solvents include methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate.

Specific examples of the alcohol-based solvents include higher alcohols such as isomyristyl alcohol, isopalmityl alcohol, isostearyl alcohol and oleyl alcohol.

Examples of the higher fatty acid-based solvents include isononanoic acid, isomyristic acid, hexadecanoic acid, isopalmitic acid, oleic acid and isostearic acid.

Examples of the ether-based solvents include diethylene glycol monobutyl ether, ethylene glycol monobutyl ether, propylene glycol monobutyl ether and propylene glycol dibutyl ether.

Examples of the surfactants that act as emulsifiers include anionic surfactants such as metal soaps, higher alcohol sulfate ester salts and sulfate ester salts of polyoxyethylene adducts; cationic surfactants such as primary to tertiary amine salts and quaternary ammonium salts; ether-based nonionic surfactants such as higher alcohol polyoxyethylene ethers, alkylphenol polyoxyethylene ethers and polyoxypropylene polyoxyethylene ethers; ester-based nonionic surfactants formed from a polyhydric alcohol and a fatty acid such as sorbitan fatty acid esters and polyglycerol fatty acid esters; ether ester-based nonionic surfactants such as fatty acid polyoxyethylene ethers, polyoxyethylene ethers of polyglycerol fatty acid esters, and castor oil polyoxyethylene ethers; nitrogen-containing nonionic surfactants such as fatty acid alkylolamides; and combinations of two or more of these surfactants.

The amount added of the above surfactants may be determined with due consideration of factors such as the molar concentration of each of the surfactants, the surface area of the interface between the water phase and the oil phase, and in some cases the surface area of the interface between the oil phase and solids such as the pigment. The amount of the surfactant is generally within a range from approximately 0.1 to 10 mass %, and preferably from 1 to 5 mass %, relative to the total mass of the ink. In some cases, the water phase components of the present invention may include a surfactant for dispersing powdered particles such as the colorant, and a surfactant for preparing an oil-in-water resin emulsion, and in such cases, the surfactants are preferably selected to ensure that interaction between the two surfactants does not cause disintegration of the water-in-oil emulsion.

Examples of the above resin components include phenol resins, maleate resins, petroleum resins, rubber resins, alkyd resins, rosin-modified resins, and combinations of two or more of these resins. These resin components impart the ink with viscosity, enabling the stability of the emulsion to be improved.

When preparing an emulsion ink for stencil printing, a high-viscosity solvent and a resin are preferably added to the oil phase to enable the viscosity of the overall ink to be adjusted to a higher level. When preparing an emulsion ink for inkjet printing, a low-viscosity solvent is preferably added to the oil phase, and the amount of resin added is preferably restricted, thereby lowering the viscosity of the oil phase and reducing the viscosity of the overall ink.

Besides the components listed above, the oil phase of the present invention may also include compounds containing a wax or the like as the main component, which act as auxiliary agents for regulating the fluidity, provided the inclusion of these compounds does not impair the formation or stability of the emulsion.

Further, besides the components described above, the ink of the present invention may also include antioxidants, extender pigments, pH regulators, preservatives and antifungal agents and the like in the water phase and/or the oil phase.

In terms of the antioxidants, dibutylhydroxytoluene, propyl gallate, octyl gallate, tocopherol or butylhydroxyanisole or the like may be used within the oil phase, whereas sodium erisorbate or sodium ascorbate or the like may be used within the water phase. Combinations of two or more of these antioxidants may also be used.

Examples of the extender pigments include inorganic microparticles of materials such as white clay, talc, clay, diatomaceous earth, calcium carbonate, barium sulfate, titanium oxide, alumina white, silica, kaolin, mica and aluminum hydroxide, organic microparticles of polyacrylate esters, polyurethane, polyester, polyethylene, polypropylene, polyvinyl chloride, polyvinylidene chloride, polystyrene, polysiloxane, phenol resins, epoxy resins and benzoguanamine resins, as well as microparticles of copolymers of the above resins, and combinations of two or more of the above extender pigments. These extender pigments are able to increase the print density and prevent ink show-through.

Examples of the pH regulators include triethanolamine, sodium hydroxide, ammonia, and combinations of two or more such pH regulators.

The printing method of the present invention is a printing method that uses the above emulsion ink of the present invention. Although there are no particular restrictions on the printing system employed, a stencil printing system or inkjet printing system is preferred.

The stencil printing system includes preparing a printing plate from a stencil printing base paper, and pressing the prepared stencil printing base paper against the printing target, thereby causing the ink of the present invention to pass through the perforations formed in the stencil base paper and be transferred onto the printing target. Although there are no particular restrictions on the stencil printing apparatus used, a digital stencil printing apparatus is preferred, as it offers superior operability.

The inkjet printing system may be a piezo system, an electrostatic system or a thermal system and the like. In those cases where an inkjet recording apparatus is used, the ink according to the present invention is discharged from the inkjet head based on a digital signal, and the discharged ink droplets are adhered to the recording medium.

Further, the method for producing an emulsion ink according to the present invention is a method for producing a water-in-oil emulsion ink having an oil phase and a water phase, the method comprising: preparing a first water phase comprising a colorant, preparing a first emulsion comprising the first water phase and a portion of the oil phase, preparing a second water phase comprising no colorant, preparing a second emulsion comprising the second water phase and another portion of the oil phase, and mixing the first emulsion and the second emulsion, wherein the amount (mass) of the first water phase is less than the amount (mass) of the second water phase.

According to this production method of the present invention, an ink can be produced in which a water phase comprising a colorant and a water phase comprising no colorant can coexist within the ink in a specified mass ratio.

FIG. 1 is a flowchart of one embodiment of the method for producing an emulsion ink according to the present invention.

As illustrated in FIG. 1, first, a water phase 1 that functions as the first water phase comprising a colorant is prepared (S1), and subsequently, with a portion of the oil phase undergoing constant stirring, the water phase 1 is gradually added dropwise to the oil phase portion and emulsified, thus completing preparation of an emulsion 1 that functions as the first emulsion (S2). Further, a water phase 2 that functions as the second water phase comprising no colorant is prepared (S3), and with another portion of the oil phase undergoing constant stirring, the water phase 2 is gradually added dropwise to the oil phase portion and emulsified, thus completing preparation of an emulsion 2 that functions as the second emulsion (S4). In terms of the oil phase, the total residual portion of the oil phase may be mixed with the water phase 2, or a portion of the residual oil phase may be mixed with the water phase 2, and any remaining oil then mixed with the ink at a later stage. Next, the emulsion 1 and the emulsion 2 are mixed (S5). During this mixing, by using a weaker shearing force than that used in the above emulsification steps, the water phase 1 and the water phase 2 can be prevented from combining.

In the above production method, the amount (mass) of the water phase 1 is adjusted so as to be less than the amount (mass) of the water phase 2. The mass ratio between the water phase 1 and the water phase 2 is preferably within a range from 1:1.1 to 1:4.0, and is more preferably from 1:1.2 to 1:2.2.

Furthermore, examples of production apparatus that may be used include emulsifiers such as a disper mixer, homomixer or high-pressure homogenizer.

In the emulsion ink produced in this manner, the water phase 1 comprising a colorant and the water phase 2 comprising no colorant coexist within the ink in a specified mass ratio, enabling favorable print quality to be obtained, with a high print density and a superior matte finish.

EXAMPLES

A more detailed description of the present invention is provided below based on a series of examples, although the present invention is in no way limited by these examples.

Examples 1 to 3

Comparative Examples 1 to 5

Inks of examples 1 to 3 and comparative examples 1 to 5 were prepared using the components listed in Table 1. These inks were prepared as stencil printing inks. The components used were as listed below.

Rosin ester (manufactured by Arakawa Chemical Industries, Ltd.)

Alkyd resin (manufactured by Harima Chemicals, Inc.)

AF6 (a petroleum-based solvent, viscosity (40° C.): 5.6 $mm^2/s$, manufactured by Nippon Oil Corporation)

Soybean oil (manufactured by Nisshin OilliO Group, Ltd.)

Antioxidant (dibutylhydroxytoluene, manufactured by Nikki-Universal Co., Ltd.)

Sorbitan monooleate (manufactured by Nikko Chemicals Co., Ltd.)

Sodium salt of β-naphthalenesulfonic acid-formalin condensate (manufactured by Kao Corporation)

Triethanolamine (manufactured by Kanto Chemical Co., Inc.)

Glycerol (manufactured by Wako Pure Chemical Industries, Ltd.)

Carbon black (MA100, manufactured by Mitsubishi Chemical Corporation)

(Method of Preparation)

The oil phase, water phase 1 and water phase 2 were prepared in advance using the components shown in Table 1, the emulsion 1 and emulsion 2 were subsequently prepared in accordance with the method described below, and the inks of examples 1 to 3 and comparative examples 1 to 5 were then prepared. The values for the blend ratio between the emulsion 1 and the emulsion 2 are shown in Table 2.

In examples 1 to 3, the water phase 1 comprising the pigment and the water phase 2 comprising no pigment were prepared separately, and using a vacuum emulsification apparatus PVQ-3 (manufactured by Mizuho Industrial Co., Ltd., this also applies to subsequent references), a portion of the oil phase was stirred at a disper rotation rate of 3,000 rpm, while the water phase 1 comprising the pigment was gradually added dropwise and emulsified, thus forming the emulsion 1. In a similar manner, the residual portion of the oil phase was stirred while the water phase 2 comprising no pigment was gradually added dropwise and emulsified, thus forming the emulsion 2. Subsequently, the emulsion 1 and the emulsion 2 were mixed together using the vacuum emulsification apparatus PVQ-3, with the disper rotation rate set to a lower level of 500 rpm, thus completing preparation of the emulsion ink. Preparation of examples 1 to 3 was conducted so that the mass ratio of water phase 1:water phase 2 was 1:2.1, 1:1.4, and 1:1.2 respectively.

In comparative example 1, all of the water phase components including the pigment were incorporated within the water phase, and the oil phase was then stirred in the vacuum emulsification apparatus PVQ-3 at a disper rotation rate of 3,000 rpm while the water phase was gradually added dropwise and emulsified, thus completing preparation of the emulsion ink.

In comparative example 2, the water phase 1 comprising the pigment and the water phase 2 comprising no pigment were prepared separately, and the oil phase was then stirred in the vacuum emulsification apparatus PVQ-3 at a disper rotation rate of 3,000 rpm while the water phase 1 comprising the pigment was gradually added dropwise and emulsified, and consecutively thereafter, the water phase 2 comprising no pigment was gradually added dropwise and emulsified, thus completing preparation of the emulsion ink. The preparation of comparative example 2 was conducted so that the mass ratio of water phase 1:water phase 2 was 1:2.1.

In comparative examples 3 to 5, emulsion inks were prepared using the same method as that described for examples 1 to 3, but in comparative example 3, the amount of the water phase 1 comprising the pigment was the same as the amount of the water phase 2 comprising no pigment, and in comparative examples 4 and 5, the amount of the water phase 1 comprising the pigment was larger than the amount of the water phase 2 comprising no pigment. In other words, in comparative examples 3 to 5, the mass ratio of water phase 1:water phase 2 was adjusted to 1:1.0, 1:0.7 and 1:0.4 respectively.

(Evaluations)

Using the inks of examples 1 to 3 and comparative examples 1 to 5, evaluations of the print density and gloss were performed. The results are shown in Table 1.

(Gloss)

Using the inks of examples 1 to 3 and comparative examples 1 to 5, solid images were printed using a YBA-type baker applicator (manufactured by Yoshimitsu Seiki Co., Ltd.) with the film thickness set to 20 μm, 12.5 μm or a very thin film (where printing was conducted with the thickness value set to 0). The gloss of a solid printed portion of each image was measured using a gloss meter (MULTI GLOSS 268, manufactured by Konica Minolta Holdings, Inc.).

(Print Density)

Using the solid images printed for the above gloss evaluations, the print density of a solid printed portion of each image was measured using an OD meter (RD-918, manufactured by GretagMacbeth AG) and the OD value was determined.

(Visual Density Evaluation)

Using the solid images printed for the above gloss evaluations, the printed items with a printed film thickness of 12.5 μm were inspected visually. Inspection was conducted using artificial sunlight from a SOLAX XC-100 device (manufactured by Seric., Ltd.) for illumination. Using comparative example 1 as a reference, the inspection results were reported using the symbol A for those images exhibiting the greatest density, the symbol B for the next most dense images, and the symbol C for images that had similar density to comparative example 1.

TABLE 1

| | | (Mass %) | Example 1 | Example 2 | Example 3 | Comparative example 1 | Comparative example 2 | Comparative example 3 | Comparative example 4 | Comparative example 5 |
|---|---|---|---|---|---|---|---|---|---|---|
| Oil phase | Resin | Rosin ester | 4.50 | 4.50 | 4.50 | 4.50 | 4.50 | 4.50 | 4.50 | 4.50 |
| | | Alkyd resin | 2.50 | 2.50 | 2.50 | 2.50 | 2.50 | 2.50 | 2.50 | 2.50 |
| | Solvent | AF6 | 8.50 | 8.50 | 8.50 | 8.50 | 8.50 | 8.50 | 8.50 | 8.50 |
| | | Soybean oil | 6.20 | 6.20 | 6.20 | 6.20 | 6.20 | 6.20 | 6.20 | 6.20 |
| | | Antioxidant | 0.30 | 0.30 | 0.30 | 0.30 | 0.30 | 0.30 | 0.30 | 0.30 |
| | Emulsifier | Sorbitan monooleate | 3.00 | 3.00 | 3.00 | 3.00 | 3.00 | 3.00 | 3.00 | 3.00 |
| | | Total | 25.00 | 25.00 | 25.00 | 25.00 | 25.00 | 25.00 | 25.00 | 25.00 |
| Water phase 1 | Dispersant | Sodium salt of β-naphthalenesulfonic acid-formalin condensate | 1.02 | 1.02 | 1.02 | 1.02 | 1.02 | 1.02 | 1.02 | 1.02 |

TABLE 1-continued

|  |  |  |  |  |  |  |  |  |  |
|---|---|---|---|---|---|---|---|---|---|
|  | pH regulator | Triethanolamine | 0.12 | 0.12 | 0.12 | 0.12 | 0.12 | 0.12 | 0.12 | 0.12 |
|  | Wetting agent | Glycerol | — | 2.50 | 3.00 | 10.00 | — | 5.00 | 6.50 | 7.90 |
|  | Colorant | Carbon black | 6.00 | 6.00 | 6.00 | 6.00 | 6.00 | 6.00 | 6.00 | 6.00 |
|  | Water | Ion-exchanged water | 16.86 | 21.36 | 23.86 | 57.86 | 16.86 | 25.36 | 30.86 | 37.46 |
|  |  | Total | 24.00 | 31.00 | 34.00 | 75.00 | 24.00 | 37.50 | 44.50 | 52.50 |
| Water phase 2 | Dispersant | Sodium salt of β-naphthalenesulfonic acid-formalin condensate | — | — | — | — | — | — | — | — |
|  | pH regulator | Triethanolamine | — | — | — | — | — | — | — | — |
|  | Wetting agent | Glycerol | 10.00 | 7.50 | 7.00 | — | 10.00 | 5.00 | 3.50 | 2.10 |
|  | Colorant | Carbon black | — | — | — | — | — | — | — | — |
|  | Water | Ion-exchanged water | 41.00 | 36.50 | 34.00 | — | 41.00 | 32.50 | 27.00 | 20.40 |
|  |  | Total | 51.00 | 44.00 | 41.00 | — | 51.00 | 37.50 | 30.50 | 22.50 |
| Water phase total | Dispersant | Sodium salt of β-naphthalenesulfonic acid-formalin condensate | 1.02 | 1.02 | 1.02 | 1.02 | 1.02 | 1.02 | 1.02 | 1.02 |
|  | pH regulator | Triethanolamine | 0.12 | 0.12 | 0.12 | 0.12 | 0.12 | 0.12 | 0.12 | 0.12 |
|  | Wetting agent | Glycerol | 10.00 | 10.00 | 10.00 | 10.00 | 10.00 | 10.00 | 10.00 | 10.00 |
|  | Colorant | Carbon black | 6.00 | 6.00 | 6.00 | 6.00 | 6.00 | 6.00 | 6.00 | 6.00 |
|  | Water | Ion-exchanged water | 57.86 | 57.86 | 57.86 | 57.86 | 57.86 | 57.86 | 57.86 | 57.86 |
|  |  | Total | 75.00 | 75.00 | 75.00 | 75.00 | 75.00 | 75.00 | 75.00 | 75.00 |
|  | Oil phase total |  | 25.00 | 25.00 | 25.00 | 25.00 | 25.00 | 25.00 | 25.00 | 25.00 |
|  | Water phase 1 total |  | 24.00 | 31.00 | 34.00 | 75.00 | 24.00 | 37.50 | 44.50 | 52.50 |
|  | Water phase 2 total |  | 51.00 | 44.00 | 41.00 | 0.00 | 51.00 | 37.50 | 30.50 | 22.50 |
|  | Total |  | 100.00 | 100.00 | 100.00 | 100.00 | 100.00 | 100.00 | 100.00 | 100.00 |
|  | Water phase 1:water phase 2 |  | 1:2.1 | 1:1.4 | 1:1.2 | 1:0 | 1:2.1 | 1:1.0 | 1:0.7 | 1:0.4 |

| Evaluation item | Film thickness | Example 1 | Example 2 | Example 3 | Comparative example 1 | Comparative example 2 | Comparative example 3 | Comparative example 4 | Comparative example 5 |
|---|---|---|---|---|---|---|---|---|---|
| Gloss | 20 μm | 0.7 | 1.4 | 1.5 | 1.8 | 2.0 | 1.9 | 1.6 | 1.8 |
|  | 12.5 μm | 0.7 | 1.2 | 1.3 | 1.9 | 1.9 | 1.7 | 1.9 | 1.9 |
|  | Thin film | 0.6 | 1.0 | 1.2 | 1.6 | 1.8 | 1.6 | 1.5 | 1.6 |
| OD value | 20 μm | 1.42 | 1.40 | 1.41 | 1.39 | 1.42 | 1.37 | 1.40 | 1.40 |
|  | 12.5 μm | 1.43 | 1.40 | 1.39 | 1.40 | 1.42 | 1.37 | 1.40 | 1.41 |
|  | Thin film | 1.45 | 1.40 | 1.41 | 1.37 | 1.38 | 1.34 | 1.40 | 1.35 |
|  | Visual density | A | A | B | reference | C | C | C | C |

TABLE 2

| Mass (%) |  | Example 1 | Example 2 | Example 3 | Comparative example 1 | Comparative example 2 | Comparative example 3 | Comparative example 4 | Comparative example 5 |
|---|---|---|---|---|---|---|---|---|---|
| Emulsion 1 | Oil phase | 8.00 | 10.30 | 11.30 | 25.00 | 25.00 | 12.50 | 14.80 | 17.50 |
|  | Water phase 1 | 24.00 | 31.00 | 34.00 | 75.00 | 24.00 | 37.50 | 44.50 | 52.50 |
|  | Water phase 2 | 0.00 | 0.00 | 0.00 | 0.00 | 51.00 | 0.00 | 0.00 | 0.00 |
| Emulsion 2 | Oil phase | 17.00 | 14.70 | 13.70 | — | — | 12.50 | 10.20 | 7.50 |
|  | Water phase 1 | 0.00 | 0.00 | 0.00 | — | — | 0.00 | 0.00 | 0.00 |
|  | Water phase 2 | 51.00 | 44.00 | 41.00 | — | — | 37.50 | 30.50 | 22.50 |
| Total |  | 100.00 | 100.00 | 100.00 | 100.00 | 100.00 | 100.00 | 100.00 | 100.00 |

As shown in Table 1, it was clear that compared with the images of comparative examples 1 to 5, the printed image quality for examples 1 to 3 exhibited a similar level of print density and a lower gloss level with a superior matte finish. Moreover, the results of the visual evaluations revealed that examples 1 to 3 were discerned as exhibiting superior print density to comparative examples 1 to 5. The results confirmed that the printed image quality for examples 1 to 3 yielded favorable print density similar to that of conventional inks, as well as a superior matte finish with excellent distinguishability of text and the like.

Comparative example 2 exhibited similar print density and gloss values to those of comparative example 1, indicating that the water phase within the ink of comparative example 2 was a single phase that was completely uniform, similar to that of comparative example 1. In other words, it is thought that in comparative example 2, when the water phase 1 and water phase 2 having different components are added separately but consecutively to the oil phase and subsequently emulsified, the water phases are combined during the emulsification process, resulting in a situation where the components are equally dispersed between the water phases 1 and 2.

In contrast, by employing the production method used in examples 1 to 3, combination of the water phases 1 and 2 can be prevented, enabling the two water phases to coexist within the ink, and therefore a low gloss can be obtained.

Further, if compared with examples 1 to 3, although comparative examples 3 to 5 had the same total amount of pigment, because the amount of the water phase 1 was either equal to or greater than the amount of the water phase 2, although the print density was similar, the gloss was comparatively high, meaning a favorable matte finish was unobtainable.

Example 4

Comparative Example 6

Inks of example 4 and comparative example 6 were prepared using the components listed in Table 3. These inks were prepared as inkjet inks. In example 4 and comparative example 6, in order to enable preparation of an inkjet ink, a low-viscosity solvent was used in the oil phase, and no resin was used in the oil phase, thereby lowering the viscosity of the oil phase and reducing the viscosity of the overall ink.

The components used were as listed below, with other components being the same as those detailed in Table 1.

AF4 (a petroleum-based solvent, viscosity (40° C.): 2.4 mm$^2$/s, manufactured by Nippon Oil Corporation)

EXXSOL D80 (viscosity (25° C.): 2.2 mm$^2$/s, manufactured by Exxon Mobil Corporation)

(Method of Preparation)

The ink of example 4 was prepared using the same method as that described above for example 1. In example 4, preparation was conducted so that the mass ratio of water phase 1:water phase 2 was 1:2.1. The ink of comparative example 6 was prepared using the same method as that described above for comparative example 1. The blend amounts of the emulsion 1 and the emulsion 2 are shown in Table 4.

(Evaluations)

Using the inks of example 4 and comparative example 6, evaluations of the print density and gloss were performed. The results are shown in Table 3. The evaluation methods used were the same as those described above. The gloss and OD values were measured using a printed item with a film thickness of 20 μm. The visual density evaluation was performed using the same method as that described above, with the exception of using a printed item with a film thickness of 20 μm.

TABLE 3

| (Mass %) | | | Example 4 | Comparative example 6 |
|---|---|---|---|---|
| Oil phase | Solvent | AF4 | 12.50 | 12.50 |
| | | EXXSOL D80 | 11.75 | 11.75 |
| | Emulsifier | Sorbitan monooleate | 0.75 | 0.75 |
| | | Total | 25.00 | 25.00 |
| Water phase 1 | Dispersant | Sodium salt of β-naphthalenesulfonic acid-formalin condensate | 1.02 | 1.02 |
| | pH regulator | Triethanolamine | 0.12 | 0.12 |
| | Wetting agent | Glycerol | — | 2.55 |
| | Colorant | Carbon black | 6.00 | 6.00 |
| | Water | Ion-exchanged water | 16.86 | 65.31 |
| | | Total | 24.00 | 75.00 |
| Water phase 2 | Dispersant | Sodium salt of β-naphthalenesulfonic acid-formalin condensate | — | — |
| | pH regulator | Triethanolamine | — | — |
| | Wetting agent | Glycerol | 2.55 | — |
| | Colorant | Carbon black | — | — |
| | Water | Ion-exchanged water | 48.45 | — |
| | | Total | 51.00 | 0.00 |
| Water phase total | Dispersant | Sodium salt of β-naphthalenesulfonic acid-formalin condensate | 1.02 | 1.02 |
| | pH regulator | Triethanolamine | 0.12 | 0.12 |
| | Wetting agent | Glycerol | 2.55 | 2.55 |
| | Colorant | Carbon black | 6.00 | 6.00 |
| | Water | Ion-exchanged water | 65.31 | 65.31 |
| | | Total | 75.00 | 75.00 |
| Oil phase total | | | 25.00 | 25.00 |
| Water phase 1 total | | | 24.00 | 75.00 |
| Water phase 2 total | | | 51.00 | 0.00 |
| Total | | | 100.00 | 100.00 |
| Water phase 1:water phase 2 | | | 1:2.1 | 1:0 |

| Evaluation item | Film thickness | Example 4 | Comparative example 6 |
|---|---|---|---|
| Gloss | 20 μm | 0.8 | 1.4 |
| OD value | 20 μm | 1.58 | 1.46 |
| Visual density | | B | reference |

TABLE 4

| Mass (%) | | Example 4 | Camparative example 6 |
|---|---|---|---|
| Emulsion 1 | Oil phase | 8.00 | 25.00 |
| | Water phase 1 | 24.00 | 75.00 |
| | Water phase 2 | 0.00 | 0.00 |
| Emulsion 2 | Oil phase | 17.00 | — |
| | Water phase 1 | 0.00 | — |
| | Water phase 2 | 51.00 | — |
| Total | | 100.00 | 100.00 |

As shown in Table 3, it was clear that compared with the image of comparative example 6, the printed image quality for example 4 exhibited a similar level of print density and a lower gloss level with a superior matte finish. Moreover, the results of the visual evaluations revealed that example 4 was discerned as exhibiting superior print density to comparative example 6. These results confirmed that the printed image quality for example 4 yielded favorable print density similar to that of conventional inks, as well as a superior matte finish with excellent distinguishability of text and the like.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A water-in-oil emulsion ink having an oil phase and a water phase, wherein the ink has a first water phase comprising a colorant and a second water phase comprising no colorant, and an amount (mass) of the first water phase is less than an amount (mass) of the second water phase.

2. The emulsion ink according to claim 1, wherein a mass ratio between the first water phase and the second water phase is within a range from 1:1.1 to 1:4.0.

3. The emulsion ink according to claim 1, wherein the colorant is an ionic pigment or a pigment that is dispersed utilizing an ionic dispersant.

4. The emulsion ink according to claim 2, wherein the colorant is an ionic pigment or a pigment that is dispersed utilizing an ionic dispersant.

5. A printing method that utilizes the emulsion ink according to claim 1.

6. The printing method according to claim 5, wherein a mass ratio between the first water phase and the second water phase is within a range from 1:1.1 to 1:4.0.

7. The printing method according to claim 5, wherein the colorant is an ionic pigment or a pigment that is dispersed utilizing an ionic dispersant.

8. The printing method according to claim 6, wherein the colorant is an ionic pigment or a pigment that is dispersed utilizing an ionic dispersant.

9. A method for producing a water-in-oil emulsion ink having an oil phase and a water phase, the method comprising: preparing a first water phase comprising a colorant, preparing a first emulsion comprising the first water phase and a portion of the oil phase, preparing a second water phase comprising no colorant, preparing a second emulsion comprising the second water phase and another portion of the oil phase, and mixing the first emulsion and the second emulsion, wherein an amount (mass) of the first water phase is less than an amount (mass) of the second water phase.

* * * * *